United States Patent [19]

Montagne

[11] 3,948,252
[45] Apr. 6, 1976

[54] APPARATUS FOR HYDROTHERAPEUTIC TREATMENT

[76] Inventor: Jean-Baptiste Montagne, 4, rue des Tourterelles, 67200 Oberhausbergen, France

[22] Filed: Jan. 13, 1975

[21] Appl. No.: 540,669

Related U.S. Application Data

[62] Division of Ser. No. 486,583, July 8, 1974, Pat. No. 3,890,691.

[30] Foreign Application Priority Data

July 9, 1973   France .............................. 73.26061

[52] U.S. Cl. ............................................ 128/66
[51] Int. Cl.² ..................................... A61H 9/00
[58] Field of Search .......... 128/66, 369; 4/180, 182, 4/178

[56] References Cited
UNITED STATES PATENTS

| | | | |
|---|---|---|---|
| 3,251,071 | 5/1966 | Wood | 4/180 |
| 3,283,756 | 11/1966 | Turley | 128/66 |
| 3,467,969 | 9/1969 | Szekely | 4/180 |
| 3,736,924 | 6/1973 | Jacuzzi et al. | 128/66 |

FOREIGN PATENTS OR APPLICATIONS

| | | | |
|---|---|---|---|
| 639,160 | 3/1928 | France | 4/180 |
| 1,298,722 | 6/1962 | France | 4/180 |

*Primary Examiner*—Lawrence W. Trapp
*Attorney, Agent, or Firm*—Michael J. Striker

[57] ABSTRACT

An apparatus for hydrotherapeutic treatment includes a vessel having a wall of plastic material provided at a portion of its outer surface with a channel formed by a wall integral with the vessel wall. Inlet means communicate with the channel for feeding a fluid under pressure thereinto. A plurality of nozzles extend transversely through openings in the vessel and channel walls removably fixed at opposite ends to these walls. Each of the nozzles has a passage communicating with the interior of the channel and a discharge end at the inner surface of the vessel wall.

6 Claims, 9 Drawing Figures

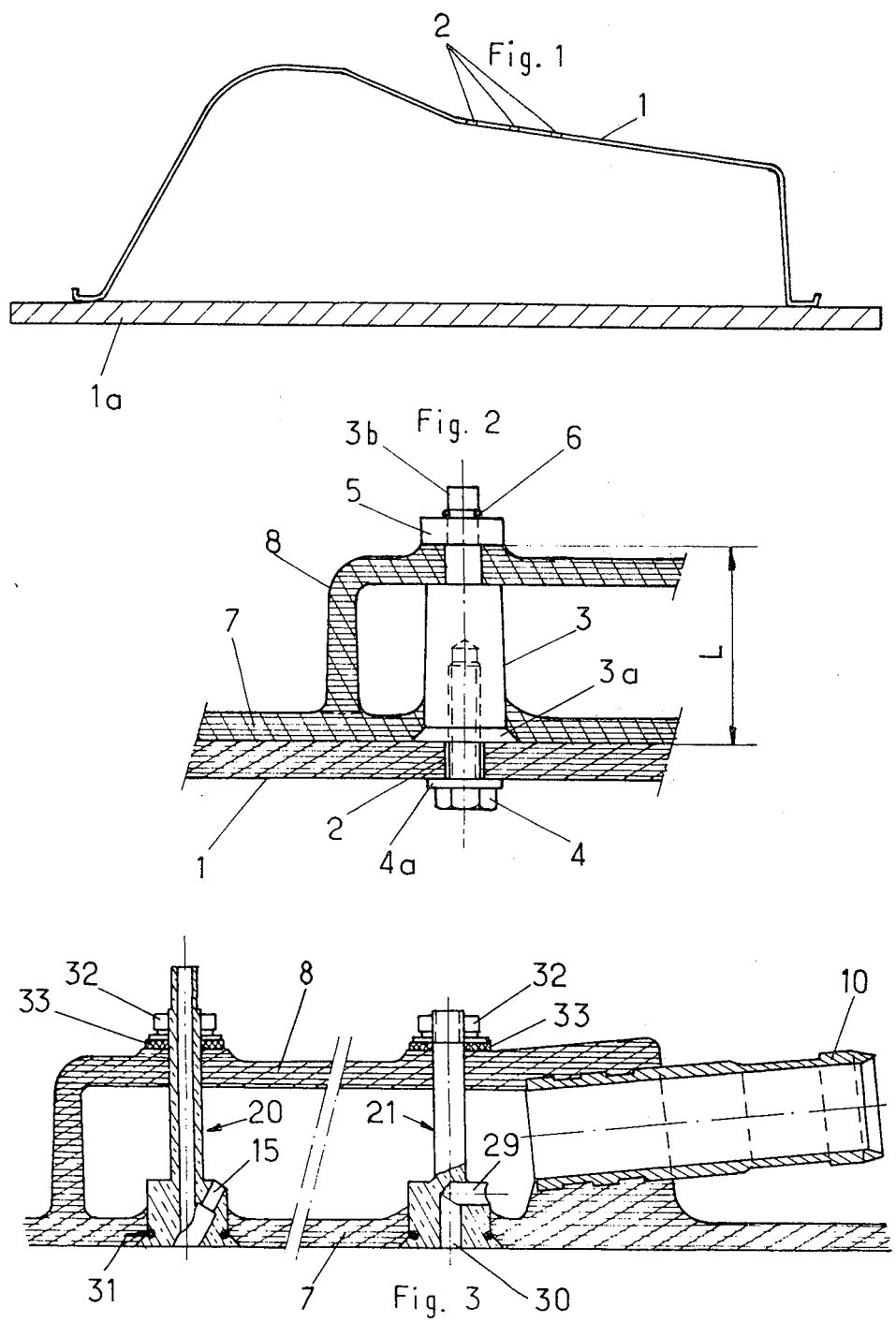

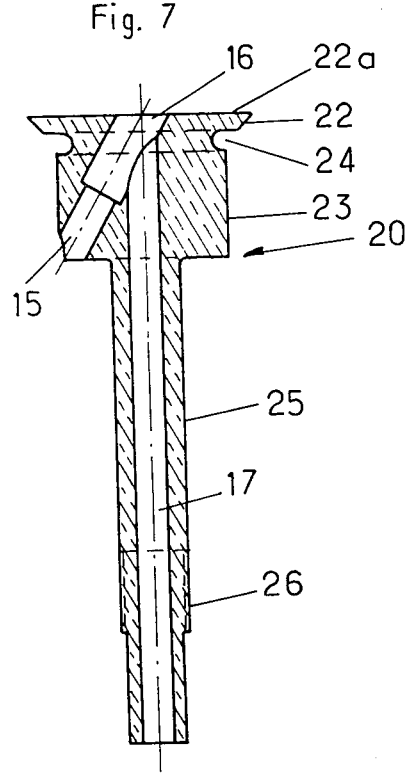
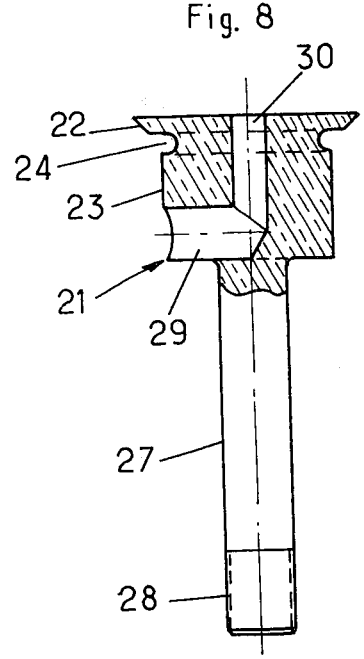
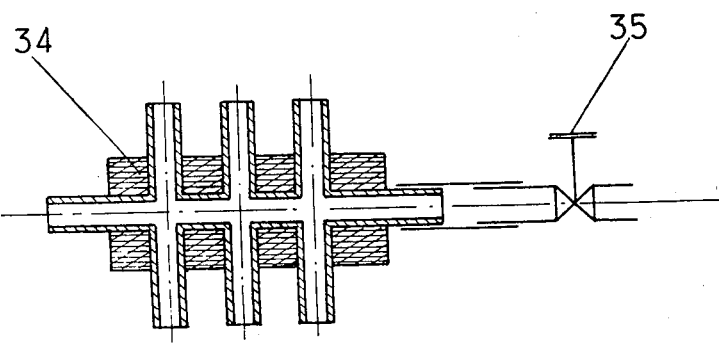

APPARATUS FOR HYDROTHERAPEUTIC TREATMENT

This is a division, of application Ser. No. 486,583, filed July 8, 1974, and now U.S. Pat. No. 3,890,691.

BACKGROUND OF THE INVENTION

Apparatus for hydro-therapeutic treatment, for example to carry out massages by water or in water with the aid of natural water, mineral water, sea water or water mixed with appropriate products or a gas are known in the art. Such massages may be applied manually by the operator by means of a jet of water under pressure, or by injection of water and gas under pressure through a plurality of jets installed in the apparatus through a plurality of orifices or appropriate nozzles which may be provided in the wall of the apparatus disposed in such a manner that the water under pressure passes through the orifices or nozzles to thus provide a massage. Usually the water or liquid is recycled by means of a pump which sucks the water from the vessel of the apparatus and recirculates the water through the aforementioned orifices or nozzles.

Thus it is often necessary to provide a vessel with a double wall provided with circulation channels for the water under pressure to feed this water to the aforementioned orifices or nozzles of injection into the interior of the apparatus that is the main trough of the same.

The methods so far known for providing such an apparatus are not adapted to provide a great number of orifices or nozzles through which water may be injected into the main trough or vessel of the apparatus due to the difficulty of construction of the body of such apparatus which may be formed from cast-iron, plastic material or other suitable materials.

Summary of the Invention

It is an object of the present invention to provide a method of forming an apparatus of the aforementioned kind which avoids the difficulties of known methods according to the prior art.

It is an additional object of the present invention to provide a method in which the nozzles are arranged that in addition to water under pressure also an appropriate auxiliary fluid may be injected therethrough, in which the nozzles are fixed in a particular manner to the remainder of the apparatus and in which a channel integral with the wall of the main vessel or trough of the apparatus is provided with which the aforementioned nozzles communicate so that water fed under pressure in the channel is injected through the nozzles into the main vessel of the apparatus.

With these and other objects in view, which will become apparent as the description proceeds, the method according to the present invention of producing an apparatus for hydro-therapeutic treatment having a vessel provided with a channel of integral double-walled structure mainly comprises the steps of providing a mold having a wall with an outer surface corresponding to the inner surface of the vessel to be produced and being formed in the wall thereof with a row of apertures, in which the mold is placed on a support with the outer surface thereof facing upwardly, whereafter in each of the aforementioned apertures an insert is fixed projecting beyond the outer surface of the mold wall. A first layer of hardenable or polymerizable plastic material is then applied onto the outer surface of the mold wall with the aforementioned inserts projecting beyond the outer surface of this first layer. An elongated plug of meltable or dissolvable material having the form of the channel to be produced and provided with a row of passages is then placed on each row of inserts with the latter respectively projecting through and beyond the passages and an additional layer of plastic material is then applied onto the free outer surface of the aforementioned plug while the first layer is still in plastic condition so that the additional layer is integrally joined to the first layer. After the layers have hardened, the inserts are removed to provide in the layers openings corresponding to surface portions of the inserts. Subsequently thereto the plug is removed by melting or dissolving the material thereof, and nozzle members having outer surface portions identical with the surface portions of the inserts are then placed into the openings previously occupied by the inserts and fixed axially immovably at opposite ends to the first and the additional layer.

The apparatus thus produced is especially characterized in that the nozzles are axially immovably fixed in the channel of integral double-wall structure.

The material from which the vessel and the channel of double-walled structure is formed is preferably a polymerizable compound of polyester and glass fibers applied to the mold and the plug for instance by spraying with a spray gun.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a longitudinal cross-section through a mold for forming the vessel of the apparatus in form of a bath tub;

FIG. 2 is a longitudinal cross-section through part of the hollow body or channel provided on the vessel in the region of a nozzle, and part of the mold shown in FIG. 1;

FIG. 3 is a partial cross-section through the aforementioned hollow body provided with a plurality of different nozzles;

FIG. 7 is an axial cross-section, shown at an enlarged scale, through a nozzle provided with a first passage inclined to the nozzle axis and a second passage extending along the nozzle axis for the respective passage of a fluid under pressure and an auxiliary fluid;

FIG. 8 is an axial cross-section, likewise shown at enlarged scale, of a different nozzle provided with only one passage therethrough; and FIG. 9 is an axial cross-section through a manifold to be connected to the axial passages of a plurality of nozzles as shown in FIG. 7 for supplying the same with air or another gas.

DESCRIPTION OF THE PREFERRED EMBODIMENTS

Figure 4:
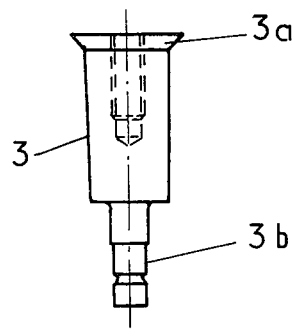
FIG. 4 is a side view of an insert used during forming of the apparatus.
Figure 5:
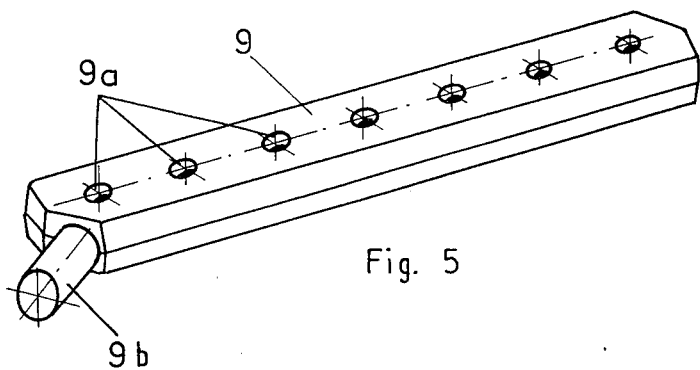
FIG. 5 is a schematic perspective view of the plug for molding the aforementioned channel.
Figure 6:
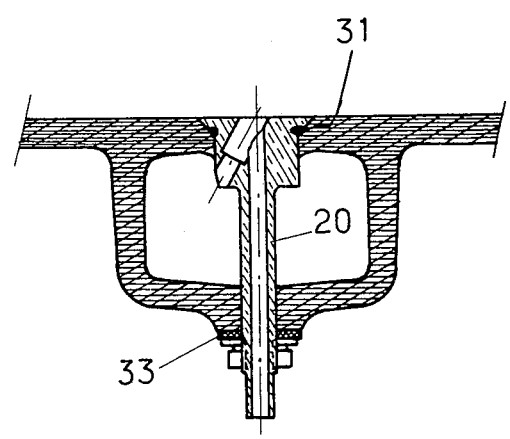
FIG. 6 is a transverse cross-section through the aforementioned channel and provided with a nozzle communicating therewith.

FIG. 1 illustrates a longitudinal cross-section through a hollow thin-walled mold 1 used for forming the vessel in form of a bathtub. The mold 1 is placed with its open end, as shown in FIG. 1, on a table or similar support 1a. The mold 1 has an outer surface corresponding to the inner surface of the vessel to be produced and is formed in a portion of its wall with one or a plurality of rows of openings 2 spaced in longitudinal direction from each other. The mold is preferably formed from polyester reinforced with glass fibers and it is carefully covered on the outer surface thereof with a film of material preventing adherence of the material to be applied to the mold to the latter. A plurality of inserts 3 of frustoconical configuration, as best shown in FIGS. 2 and 4, are then coaxially fixed at each opening 2 to the mold 1 by screws 4 respectively extending through the openings 2 and screwed into correspondingly threaded axial bores of the insert 4. A washer 4a is preferably sandwiched between the head of each screw and the inner surface of the mold 1. The inserts 3 are preferably made of Teflon or similar material which will assure that the material from which the vessel of the apparatus is formed will not stick to the insert. The wall 7 of the vessel, only partly shown in FIGS. 2 and 3, is preferably applied to the mold 1 by spraying, through a spray gun, a polymerizable mixture of polyester and glass fibers, which may be colored before spraying to any color desired. A first layer 7 of the aforementioned material is thus applied to the outer surface of the mold 1 with the inserts 3 projecting beyond this first layer. Each of said inserts has at one end, abutting against the outer surface of the mold 1, a frusto-conical end portion 3a of a larger cone angle than the main portion of the insert so as to properly anchor each insert in the first layer 7, and each insert has at the other end thereof a portion 3b of smaller diameter. An elongated plug 9 of the form as best shown in FIG. 5, molded with a row of holes or passages 9a passing therethrough, spaced from each other in the longitudinal direction of the elongated plug, is then placed on the first layer 7 with the inserts 8 respectively projecting through the holes 9a and with the portions 3b of each insert projecting beyond the upper surface of the plug 9. The plug 9 has an outer surface corresponding to the inner surface of the channel to be formed on the layer 7. The elongated plug 9 is a so-called "lost plug", that is, it is formed of material liable to melt, to disintegrate or to be dissolved in the presence of heat, water or an appropriate other solvent. The material from which the plug may be formed may be, for instance, bee wax or paraffine. The plug 9 may terminate at one end thereof with a cylindrical projection 9b onto which a, preferably metallic, tube 10, as shown in FIG. 3, is placed. Subsequently thereto an additional layer 8 of a plastic polymerizable compound which may have the same composition as the layer 7 is applied to the free outer surface of the plug 9 and around the tube 10, while the first layer 7 is still in plastic condition, so that the additional layer 8 is integrally joined to the first layer 7. The inserts 3 project with portions of the portions 3b beyond the additional layer 8, as shown in FIG. 2 and so does the outer end of the metallic tube placed onto the cylindrical projection 9b of the plug 9. A washer 5 is fixed by a snap ring 6 engaged in a corresponding groove to the projecting portion 3b of each insert so that the bottom face of the washer engages the upper surface of the additional layer 8 to maintain during the complete polymerization or hardening of the plastic material the outer surface of the additional layer 8 at a fixed distance L from the bottom face of the layer 7.

Subsequently thereto the screws 7 are unscrewed from the inserts 3, the vessel formed by the layer 7 is then removed from the mold 1, the snap rings 6 are removed from the grooves in the portions 3b of the inserts, the washers 5 are removed, and the inserts 3 withdrawn. Subsequently thereto the plug 9 is destroyed by rendering its materials flowable by heating, injection of hot water or a solvent and discharging the material through the various openings in the layers 7 and 8 to thus obtain the desired channel with openings and conical seats into which subsequently thereto the nozzles 20 or 21 of a shape as respectively shown in FIGS. 7 and 8 are inserted. Each of the nozzles 20 and 21 is provided at one end thereof with a frustoconical portion 22 of the same cone angle as the portion 3a of each insert and a portion 23 of the same cone angle of the main portion of each insert 3. An annular groove 24 is provided between the frustroconical portions 22 and 23. A stem 25 of the nozzle 20 (shown in FIG. 7) projects coaxially from one end of the frustoconical portion 23 and this stem 25 is provided adjacent its free end with an outer screw thread 26. A passage 15 inclined to the axis of the stem 25 extends through the portion 23 of the nozzle 20 and terminates at the end face 22a of the nozzle with a passage portion 16 of a slightly larger diameter than the passage 15, and an additional passage 17 extends coaxially through the stem 25 and the portion 23 communicating at one end thereof with the passage portion 16.

The nozzle 21 shown in FIG. 8 is provided with a central solid stem 27 provided at its free end with a screw thread 28. The nozzle 21 is formed with a single passage therethrough having a passage portion 28 extending transverse to the stem axis and a passage portion 29, communicating therewith and arranged coaxially with the axis of the stem. The stems 25 and 27 of the nozzles 20 and 21 have an outer surface corresponding to an outer surface portion of the insert portions 3b. The nozzles 20 or 21 are inserted through the openings formed in the walls 7 and 8 by the previously inserted inserts, in the manner as best shown in FIG. 3, so that the passages 15 or 28 and 29 communicate with the interior of the channel provided between the walls 7 and 8. A sealing ring 31 of compressible material is preferably placed in the annular groove 24 of each nozzle. The stem portions 26 or 27 of the nozzles project upwardly beyond the wall 8 and a nut 32 screwed onto the threaded portion 26 or 28 of the stem portions of the nozzles hold the latter axially immovable with respect to the walls 7 and 8. A washer of compressible material is preferably sandwiched between each nut 32 and the outer surface of the wall 8. The tube 10 is connected at its outer end, in a manner not shown in the drawing, to a supply of water under pressure, likewise not shown. The axial passage 17 of the nozzles 20 may be connected to passages in a manifold 34, shown in FIG. 9, which is supplied through a valve 35 with an auxiliary fluid, for instance a gas under pressure from a supply not shown in the drawing.

It will be understood that each of the elements described above, or two or more together, may also find a useful application in other types of apparatus differing from the types described above.

While the invention has been illustrated and described as embodied in an apparatus for hydro-therapeutic treatment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an apparatus for hydro-therapeutic treatment, a combination comprising a vessel having a wall of plastic material provided at a portion of its outer surface with at least one channel constituted by a wall integral with the vessel wall; inlet means communicating with said channel for feeding a fluid under pressure thereinto; and a plurality of nozzles extending transversely through said channel through openings in said vessel wall and said channel wall and being axially immovably fixed at opposite ends in said wall of said vessel and said channel wall integral with said vessel wall, each of said nozzles having a passage communicating with the interior of said channel and having a discharge end at the inner surface of said vessel wall.

2. A combination as defined in claim 1, wherein said vessel wall is provided with a plurality of frustoconical openings tapering in a direction away from the inner surface of said vessel, and wherein each of said nozzles has a corresponding frustoconical outer surface portion located within a respective frustoconical opening and tightly engaging the surface defining the latter.

3. A combination as defined in claim 1, wherein at least some of said nozzles are provided with an additional passage extending longitudinally therethrough and communicating at one end with said first mentioned passage and adapted to be connected at the other end to a supply of auxiliary fluid.

4. A combination as defined in claim 3, wherein said first-mentioned passage is inclined to the axis of said nozzle, and wherein said nozzle is turnably arranged in respective openings of said vessel wall and said channel wall to thereby change the direction of the fluid jet passing through said inclined passage.

5. A combination as defined in claim 1, wherein said passage has at the discharge end a portion of larger diameter that the remainder of said passage.

6. A combination as defined in claim 3, and including manifold means for supplying the other end of each additional passage with said auxiliary fluid.

* * * * *